US012504777B1

(12) United States Patent
Auer et al.

(10) Patent No.: US 12,504,777 B1
(45) Date of Patent: Dec. 23, 2025

(54) SYSTEMS FOR INTERCHANGEABLE KNOB ASSEMBLIES

(71) Applicant: WHIRLPOOL CORPORATION, Benton Harbor, MI (US)

(72) Inventors: Alexander Robert Auer, St. Joseph, MI (US); Layna Simone Givens, Benton Harbor, MI (US); Paul J. Neuman, St. Joseph, MI (US); Pravin A. Shinde, Pune (IN); Pradeep S. Thorat, Stevensville, MI (US); Nehal Arvind Sayankar, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/891,238

(22) Filed: Sep. 20, 2024

(51) Int. Cl.
*G05G 1/12* (2006.01)
*F24C 3/12* (2006.01)
*F24C 7/08* (2006.01)
*G05G 5/04* (2006.01)

(52) U.S. Cl.
CPC ............... *G05G 1/12* (2013.01); *F24C 3/126* (2013.01); *F24C 7/082* (2013.01); *G05G 5/04* (2013.01)

(58) Field of Classification Search
None
See application file for complete search history.

(56) References Cited

U.S. PATENT DOCUMENTS

| | | | | |
|---|---|---|---|---|
| 2,005,792 | A | 6/1935 | Leins | |
| 2,661,173 | A | 12/1953 | Walser | |
| 3,769,933 | A | 11/1973 | Fox | |
| 5,931,150 | A * | 8/1999 | Bowen | F24C 7/082 126/39 N |
| 9,684,329 | B2 * | 6/2017 | Lawson | G05G 1/082 |
| 9,852,856 | B2 | 12/2017 | Bowen | |
| 10,174,951 | B2 | 1/2019 | Choi | |
| 10,345,514 | B2 | 7/2019 | Kozinski et al. | |
| 10,782,724 | B1 * | 9/2020 | Metzmeier | F24C 7/08 |
| 11,098,903 | B2 | 8/2021 | Dolinski et al. | |
| 11,143,411 | B2 | 10/2021 | Kim et al. | |
| 2014/0260775 | A1 | 9/2014 | Freeman et al. | |
| 2018/0017263 | A1 * | 1/2018 | Roberts | F24C 3/124 |
| 2022/0178550 | A1 | 6/2022 | Krueger | |
| 2022/0196245 | A1 | 6/2022 | Ha | |

* cited by examiner

*Primary Examiner* — Vicky A Johnson
(74) *Attorney, Agent, or Firm* — Price Heneveld LLP

(57) ABSTRACT

A backer apparatus includes a body defining a front side for interfacing with a knob assembly and a rear side for interfacing with a cooking appliance. An inner wall extends between the front side and the rear side and includes an outer surface and an inner surface. The inner surface defines a channel extending about an axis for receiving a stem of the knob assembly. At least one flange extends from the outer surface radially outwardly from the axis and at least partially defines the rear side for interfacing with the cooking appliance. A plurality of chamfers extend from the outer surface radially outwardly from the axis and at least partially define the front side. At least one of the plurality of chamfers defines a chamfer opening for receiving a fastener.

20 Claims, 10 Drawing Sheets

SYSTEMS FOR INTERCHANGEABLE KNOB ASSEMBLIES

FIELD OF THE DISCLOSURE

The present disclosure generally relates to a system for a cooking appliance that is configured to easily interchange a variety of knob assemblies.

BACKGROUND

Cooking appliances, such as cooktops with one or more burners, often employ control knob assemblies that control operation of the burners. The knob assemblies typically include a knob that couples to a control stem of the cooking appliance. The control stem extends from a control module within the cooking appliance and through an aperture in an outer skin of the cooking appliance. The knob assemblies typically further include a bezel that abuts the outer skin, wrapping around the aperture, to conceal the stem and an aperture. The bezel adds both aesthetic and operational benefits. More particularly, obscuring the aperture provides a seamless aesthetic to the cooking appliance and also prevents debris from entering into the aperture. Oftentimes, a knob assembly can experience wear and tear over repeated usage, warranting a need or requirement for replacement. Likewise, a user may also prefer certain aesthetics of the knob assembly, such as color, shape, and overall appearance. However, changing the knob assembly can be difficult and may require servicing by a professional.

Accordingly, the present disclosure relates to a system for a cooking appliance that is configured to easily interchange a variety of knob assemblies.

SUMMARY OF THE DISCLOSURE

According to one aspect of the present disclosure, a backer apparatus includes a body defining a front side for interfacing with a knob assembly and a rear side for interfacing with a cooking appliance. An inner wall extends between the front side and the rear side and includes an outer surface and an inner surface. The inner surface defines a channel extending about an axis for receiving a stem of the knob assembly. At least one flange extends from the outer surface radially outwardly from the axis and at least partially defines the rear side for interfacing with the cooking appliance. A plurality of chamfers extends from the outer surface radially outwardly from the axis and at least partially defines the front side. At least one of the plurality of chamfers defines a chamfer opening for receiving a fastener.

According to another aspect of the present disclosure, a cooking appliance includes an appliance body including a cooktop having a burner, and a panel defining an aperture for receiving a knob assembly that controls the burner. A backer apparatus is coupled to the panel. The backer apparatus includes a body defining a front side for interfacing with the knob assembly and a rear side for interfacing with the panel. An inner wall extends between the front side and the rear side and includes an outer surface and an inner surface. The inner surface defines a channel extending about an axis and aligned with the aperture on the panel. A plurality of flanges extends from the outer surface radially outwardly from the axis and at least partially defines the rear side abutting the panel. At least one of the plurality of flanges defines a first flange opening aligned with and secured to the appliance body with a fastener. A plurality of chamfers extend from the outer surface radially outwardly from the axis and at least partially define the front side. Each of the plurality of chamfers includes a clockwise chamfer surface and a counterclockwise chamfer surface, one of the clockwise chamfer surfaces or the counterclockwise chamfer surfaces defining a stop wall for abutting a tab of the knob assembly upon relative rotation.

According to yet another aspect of the present disclosure, a system for a cooking appliance includes a knob assembly that has a knob with a stem configured to mate with a control stem of the cooking appliance and a bezel. The bezel includes an inner bezel wall defining a bezel channel that extends around an axis for accommodating the knob. The inner bezel wall defines at least one tab extending radially inwardly towards the axis. A backer apparatus is configured to connect the knob assembly to the cooking appliance. The backer apparatus includes a body defining a front side for interfacing with the knob assembly and a rear side for interfacing with the cooking appliance. An inner wall extends between the front side and the rear side and includes an outer surface and an inner surface. The inner surface defines a channel extending about the axis and aligned with the bezel channel. A plurality of chamfers extend from the outer surface radially outwardly from the axis and at least partially define the front side. Each of the plurality of chamfers includes a clockwise chamfer surface and a counterclockwise chamfer surface, one of the clockwise chamfer surfaces or the counterclockwise chamfer surfaces defines a stop wall for abutting the at least one tab of the bezel upon relative rotation.

These and other features, advantages, and objects of the present disclosure will be further understood and appreciated by those skilled in the art by reference to the following specification, claims, and appended drawings.

Figure 1:
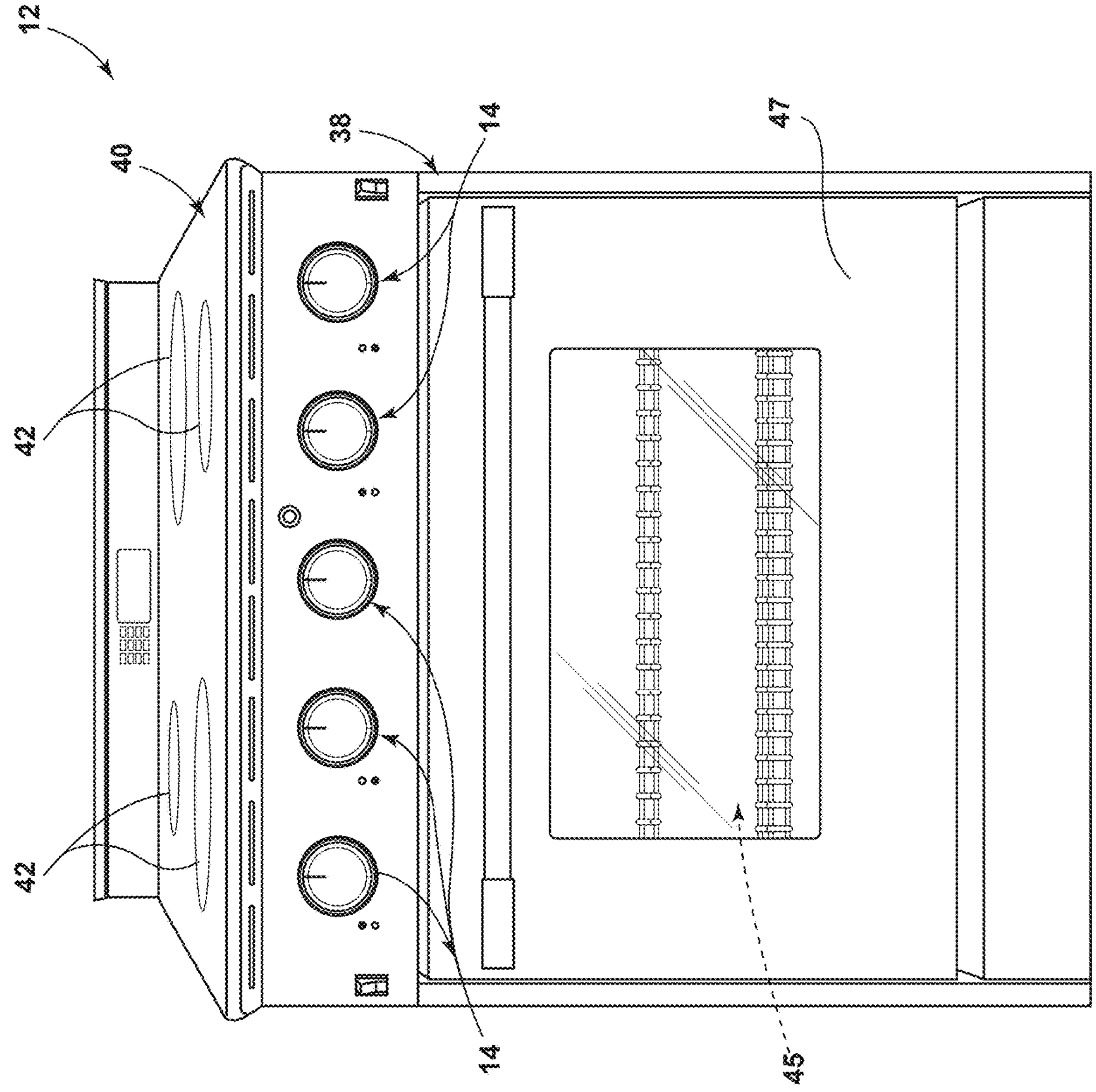
FIG. 1 is a front elevational view of a cooking appliance with a plurality of burners and corresponding control knob assemblies, according to an aspect of the present disclosure.

The components in the figures are not necessarily to scale, emphasis instead being placed upon illustrating the principles described herein.

DETAILED DESCRIPTION

The present illustrated embodiments reside primarily in a system for a cooking appliance that is configured to easily interchange a variety of knob assemblies. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer and/or user, and the term "rear" shall refer to the surface of the element further from the intended viewer and/or user. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring initially to FIGS. 1-3C, a backer apparatus of a first construction is designated with reference numeral 10. The backer apparatus 10 of the first and subsequent constructions are configured to be used with a cooking appliance 12 and, more particularly, to mount a knob assembly 14 to the cooking appliance 12. The backer apparatus 10 includes a body 16 defining a front side 18 for interfacing with the knob assembly 14 and a rear side 20 for interfacing with the cooking appliance 12. An inner wall 22 extends between the front side 18 and the rear side 20 and includes an outer surface 24 and an inner surface 26. The inner surface 26 defines a channel 28 extending about an axis A for receiving a stem of the knob assembly 14. At least one flange 30 extends from the outer surface 24 radially outwardly from the axis A and at least partially defines the rear side 20 for interfacing with the cooking appliance 12. A plurality of chamfers 32 extend from the outer surface 24 radially outwardly from the axis A and at least partially define the front side 18. At least one of the plurality of chamfers 32 defines a chamfer opening 34 for receiving a fastener 36A.

Figure 3A:
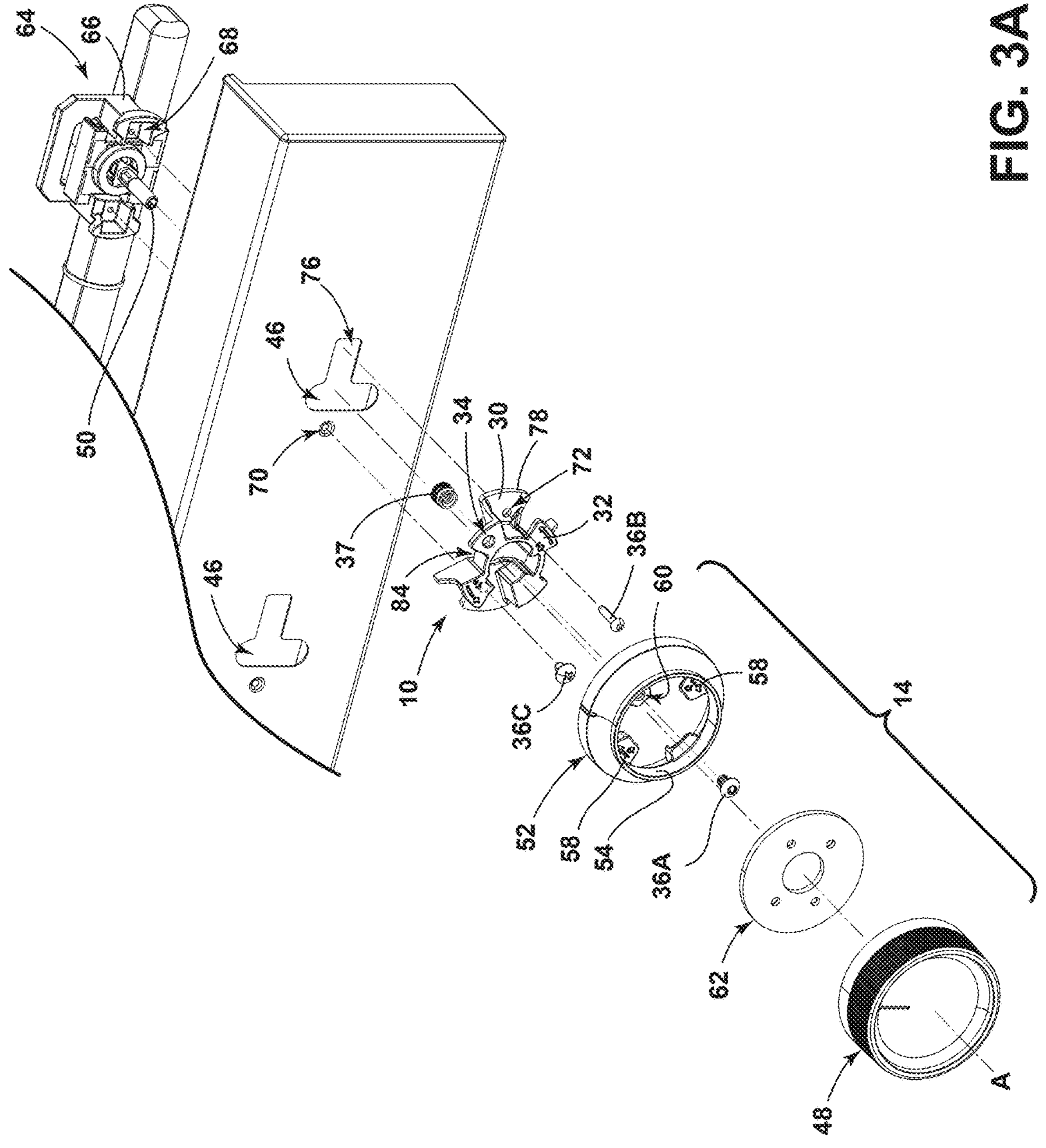
FIG. 3A is a perspective, partially disassembled view depicting a system of a first construction configured to easily interchange a variety of knob assemblies, according to an aspect of the present disclosure.

With reference now to FIGS. 1 and 3A, the cooking appliance 12 includes an appliance body 38 defining a cooktop 40 having at least one burner 42, and a panel 44 defining an aperture 46 for receiving the knob assembly 14 that controls the at least one burner 42. In some implementations, the cooking appliance 12 may also include a cooking cavity 45 accessible via a door 47. The at least one burner 42 may include a single burner 42 or a plurality of burners 42 (e.g., two, three, four, or more burners 42). The backer apparatus 10 may be coupled to the panel 44 (e.g., the aperture 46). More particularly, the channel 28 of the backer apparatus 10 may be aligned (e.g., along the axis A) with the aperture 46 on the panel 44. The cooking appliance 12 may employ a variety of heating technologies, such as gas heating, induction heating, electric heating, and/or heating that employs all fuel types. Generally speaking, when the cooking appliance 12 employs gas heating, the aperture 46 and connection scheme of the backer apparatus 10 may differ. In this manner, the rear side 20 of the backer apparatus 10 that interfaces with the cooking appliance 12 may differ between constructions and requirements, but the front side 18 is configured to universally interface with the knob assembly 14 and, a variety of other knob assemblies that may differ in color, shape, and overall appearance. In this manner, during manufacturing, the backer apparatus 10 may be connected to the cooking appliance 12 (e.g., the aperture 46 and/or the panel 44) prior to shipment to an end-consumer. In this manner, the user may quickly and efficiently choose and replace the knob assembly 14 based on preference and need over the operational life of the cooking appliance 12.

Figure 2:
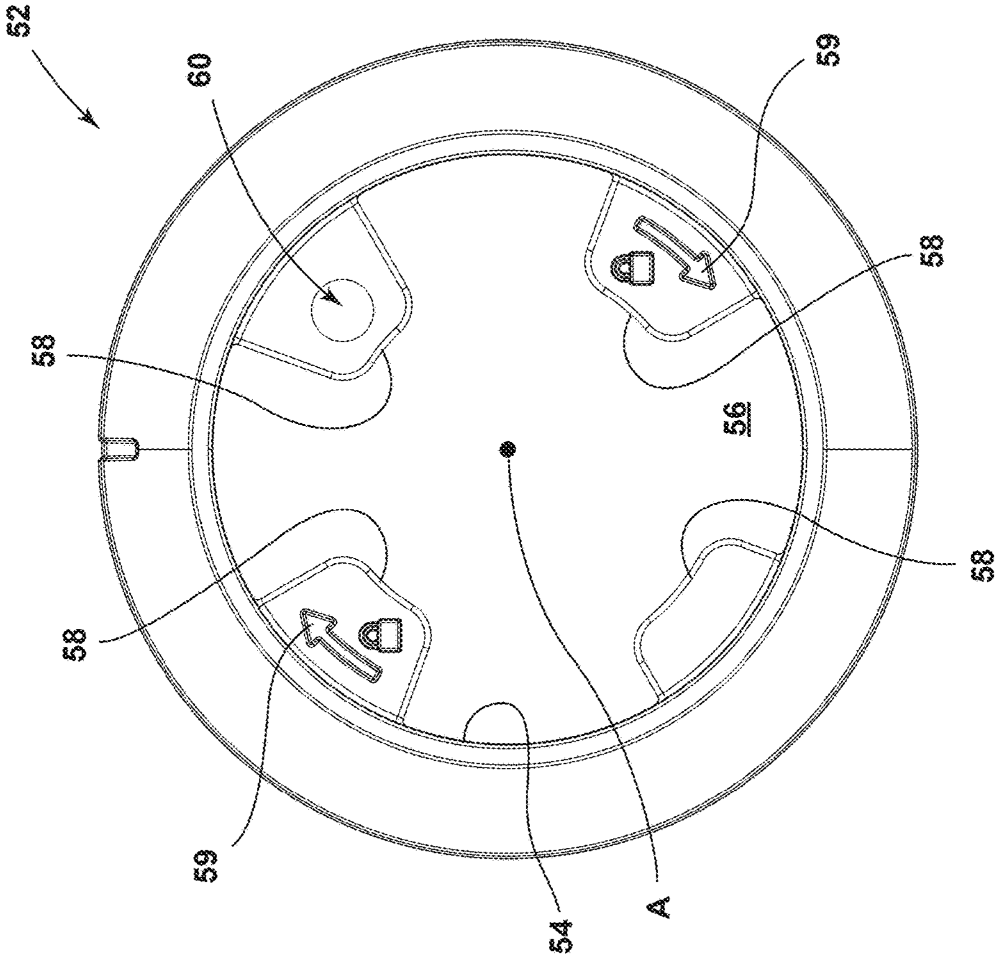
FIG. 2 is a front elevational view of a bezel of a knob assembly, according to an aspect of the present disclosure.

With reference now to FIGS. 2 and 3A, the knob assembly 14 may include a knob 48 (e.g., a control knob) with a stem configured to mate with a control stem 50 (e.g., FIG. 4A) of the cooking appliance 12 and a bezel 52. The bezel 52 is best depicted in FIG. 2 and includes an inner bezel wall 54 defining a bezel channel 56 that, when connected to the backer apparatus 10, extends around the axis A for accommodating the knob 14. The inner bezel wall 54 defines at least one tab 58 extending radially inwardly towards the axis A that interlocks with the chamfers 32. The at least one tab 58 may include a plurality of tabs 58 spaced (e.g., equally) around the inner bezel wall 54. The plurality of tabs 58 may include two, three, four, or more tabs 58. In some implementations, at least one tab 58 (e.g., two diametrically opposed tabs 58) defines a bezel indicia 59 depicting a direction of rotation to interlock or release the tabs 58 from the chamfers 32. At least one of the tabs 58 may include a bezel opening 60 for receiving the fastener 36A that extends through the chamfer opening 34, coupling the tab 58 with the associated chamfer 32. In some implementations, the knob 48 may include a metal supporting plate 62 for providing structural support to the knob 48 during operational life.

Figure 3C:
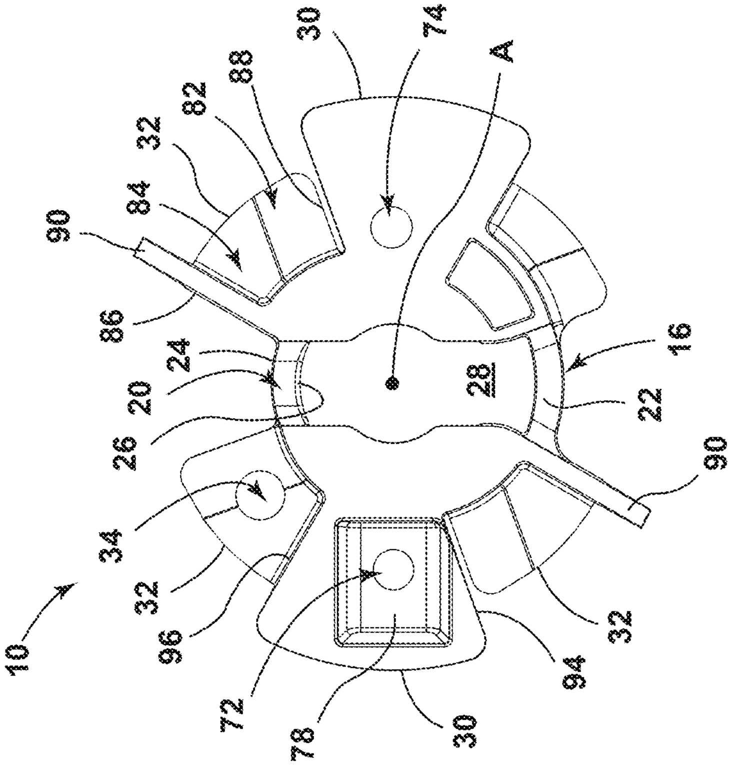
FIG. 3C is a rear elevational view of a backer apparatus from FIG. 3A, according to an aspect of the present disclosure.
Figure 3B:
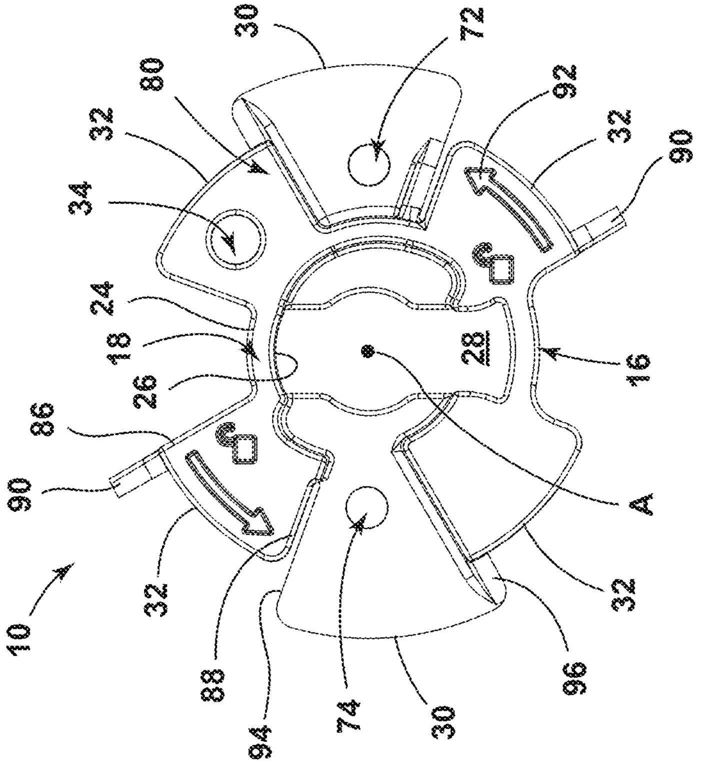
FIG. 3B is a front elevational view of a backer apparatus from FIG. 3A, according to an aspect of the present disclosure.

With reference now to FIGS. 3A-3C, the backer apparatus 10 may be implemented for connection to the cooking appliance 12 and the cooking appliance 12 may be configured to employ gas. A manifold assembly 64 (e.g., located behind panel 44) is configured to distribute gas to the burner 42 and is at least partially supported by one or more spider brackets 66 (e.g., a plurality of spider brackets 66 aligned with the knob assembly locations). The spider bracket 66 may define a bracket opening 68 and the panel 44 may include a panel opening 70. The at least one flange 30 may include a single flange 30 or a plurality of flanges 30 (e.g., two, three, or four). The at least one flange 30 may include a first flange opening 72 aligned and securable with the bracket opening 68 by a fastener 36B common to both the first flange opening 72 and the bracket opening 68. The at least one flange 30 may further include a second flange opening 74 aligned with the panel opening 70 for receiving a fastener 36C common to both the second flange opening 74 and the panel opening 70. In some implementations, the first flange opening 72 and the second flange opening 74 may be located on separate flanges 30 (e.g., diametrically opposed flanges 30). The panel 44 may define an anti-rotation orifice 76 and the rear side 20 of the backer apparatus 10 may define at least one projection 78 for insertion into the anti-rotation orifice 76, preventing rotation relative between the backer apparatus 10 and the panel 44 of the cooking appliance 12. In the depicted implementation, the anti-rotation orifice 76 is aligned with the bracket opening 68. In this manner, the first flange opening 72 may be located in and defined by the projection 78. In some embodiments, the fastener 36A includes a retainer element 37 (e.g., a bushing) that is inserted into the bezel opening 60.

With reference now to FIGS. 3B and 3C, the plurality of chamfers 32 are disposed around the axis A, and each of the chamfers 32 defines a chamfer front surface 80 at least partially defining the front side 18 (FIG. 3B) and a chamfer rear surface 82 at least partially defining a pocket 84 for receiving the tabs 58 from the bezel 52. More particularly, each of the plurality of chamfers 32 includes a clockwise chamfer surface 86 and a counterclockwise chamfer surface 88. One of the clockwise chamfer surfaces 86 or the counterclockwise chamfer surfaces 88 defines a stop wall 90 for abutting the tab 58 of the bezel 52 upon relative rotation therebetween. At least one chamfer front surface 80 includes another indicia 92 depicting a direction of rotation to interlock or release the tabs 58 of the bezel 52 in the pockets 84.

With continued reference to FIGS. 3B and 3C, the flanges 30 may each include a clockwise flange surface 94 and a counterclockwise flange surface 96, one of the clockwise flange surfaces 94 and the counterclockwise flange surfaces 96 extending to the stop wall 90. For example, based on the rotational direction selected to interlock the tabs 58 in the pockets 84, each stop wall 90 extends between one of the clockwise chamfer surfaces 86 to one of the counterclockwise flange surfaces 96. However, in other implementations, each stop wall 90 may extend between one of the counterclockwise chamfer surfaces 88 to one of the clockwise flange surfaces 94.

Figure 4A:
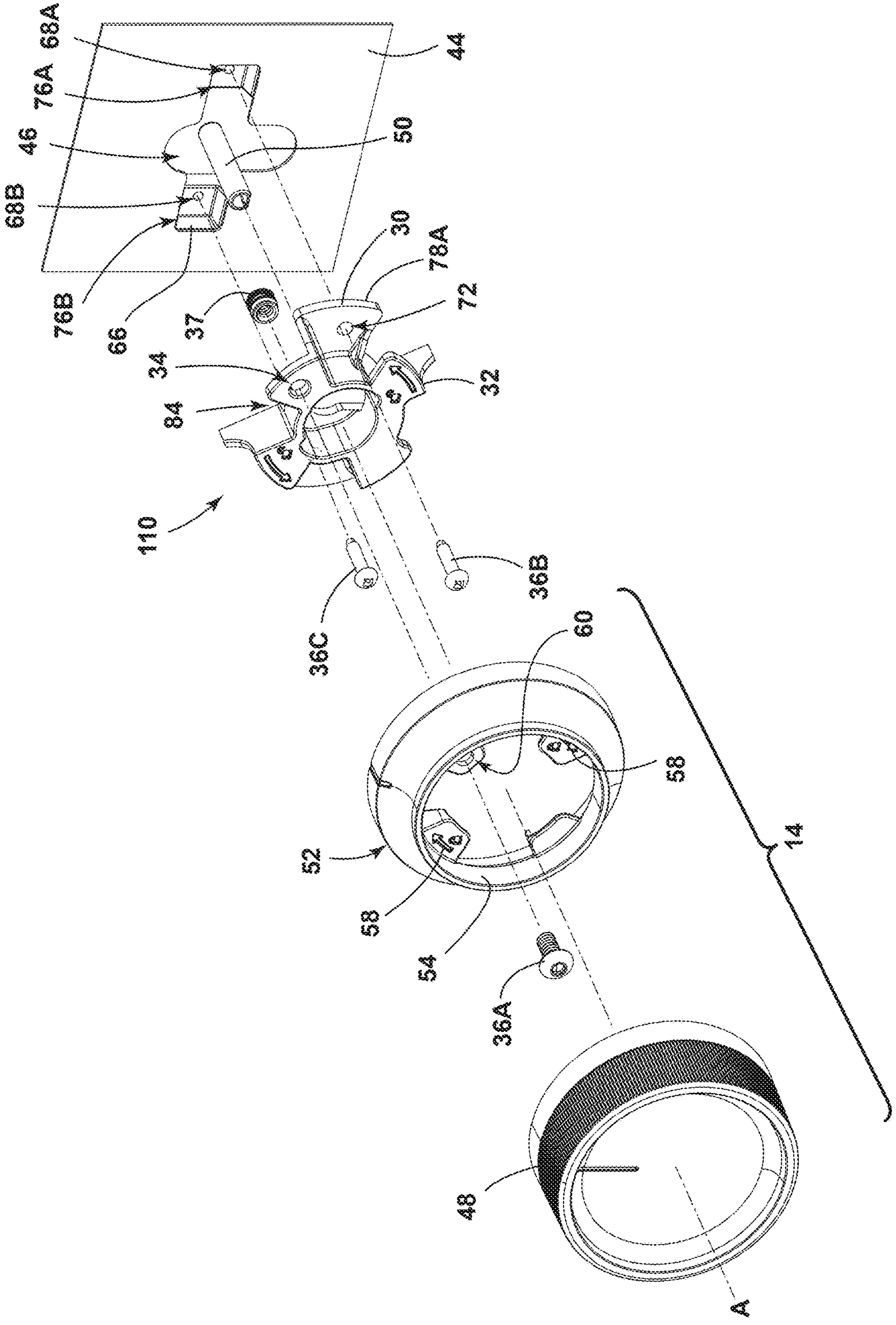
FIG. 4A is a perspective, partially disassembled view depicting a system of a second construction configured to easily interchange a variety of knob assemblies, according to an aspect of the present disclosure.
Figure 4C:
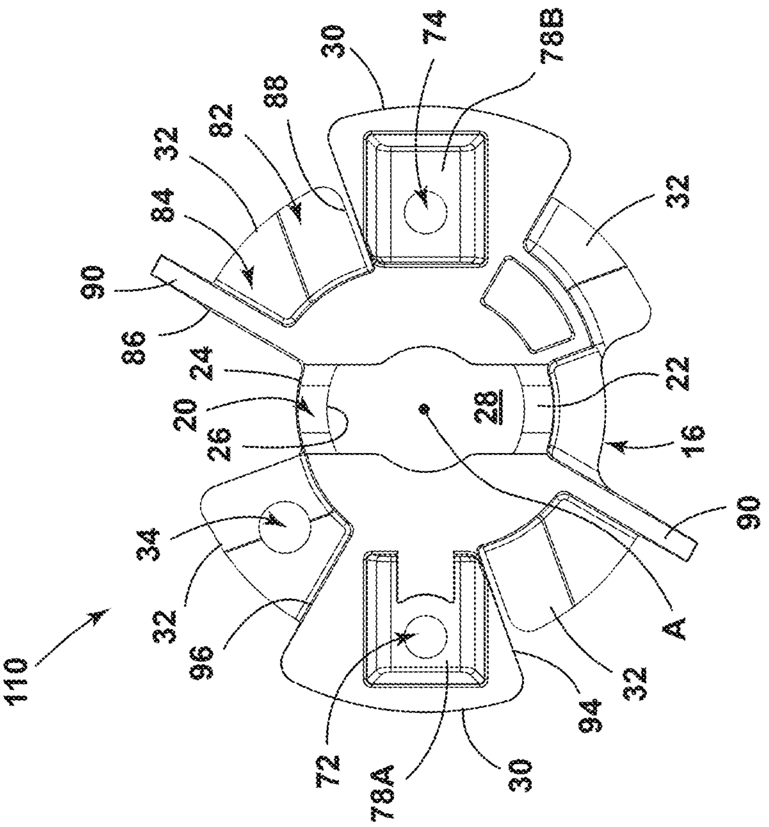
FIG. 4C is a rear elevational view of a backer apparatus from FIG. 4A, according to an aspect of the present disclosure.
Figure 4B:
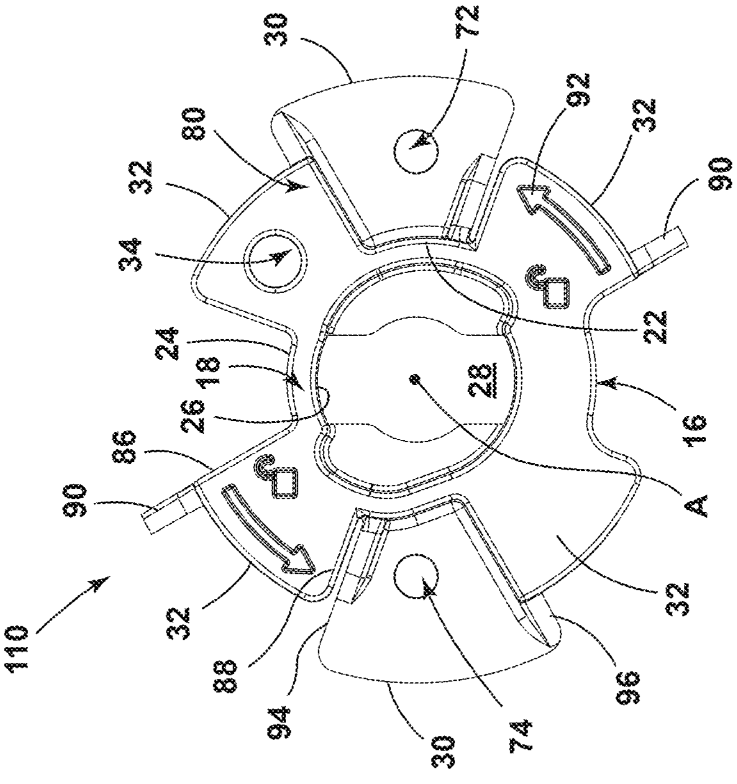
FIG. 4B is a front elevational view of a backer apparatus from FIG. 4A, according to an aspect of the present disclosure.

With reference now to FIGS. 4A-4C, a backer apparatus 110 of a second construction is depicted. Unless otherwise explicitly stated, the backer apparatus 110 of the second construction may share all the same features, elements, and assembly schemes as the first construction. For purposes of brevity, like elements between the first and second constructions share the same reference number designations between FIGS. 2-4C. More particularly, the backer apparatus 110 is configured to connect to the same knob assembly 14 and may also be configured to connect to the cooking appliance 12 and the cooking appliance 12 may be configured to employ gas. However, the spider bracket 66 defines a first and second bracket opening 68A, 68B for connection to the backer apparatus 10.

The first flange opening 72 aligned with and securable to the first bracket opening 68A by receiving the fastener 36B common to both the first flange opening 72 and the first bracket opening 68A. The second flange opening 74 may be aligned with the second bracket opening 68B for receiving a fastener 36C common to both the second flange opening 74 and the second bracket opening 68B. Further, the panel 44 may define a pair of anti-rotation orifices 76A, 76B (e.g., on opposite sides of the aperture 46) and the rear side 20 of the backer apparatus 10 may define first projection 78A and a second projection 78B for insertion into the anti-rotation orifices 76A, 76B, respectively, preventing rotation relative between the backer apparatus 10 and the panel 44 of the cooking appliance 12. In the depicted implementation, the anti-rotation orifice 76 is aligned with the bracket openings 68A, 68B. In this manner, the first and second flange openings 72, 74 may each be located in and defined by a respective one of the projections 78A, 78B. In addition, the fastener 36A may include a retainer element 37 (e.g., a bushing) that is inserted into the bezel opening 60.

Figure 5:
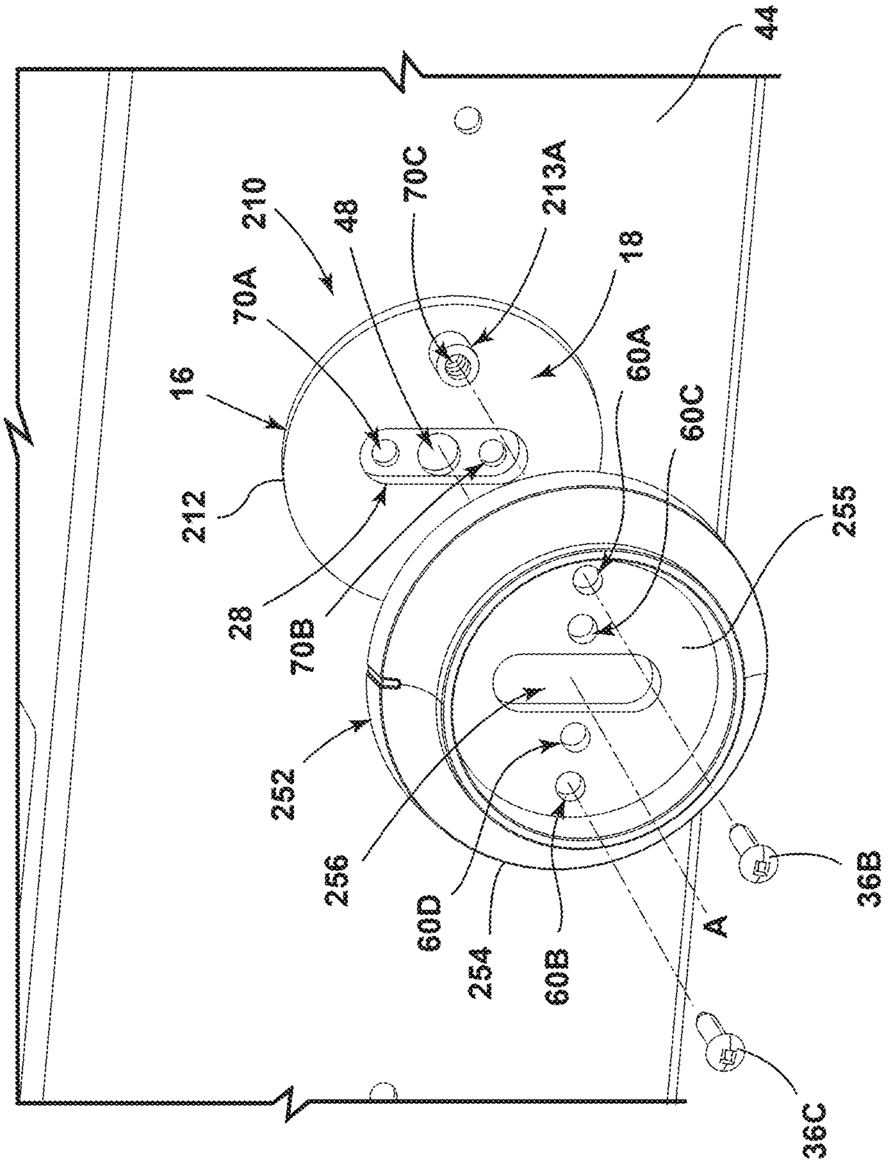
FIG. 5 is a perspective, partially disassembled view depicting a system of a third construction configured to easily interchange a variety of knob assemblies, according to an aspect of the present disclosure.

With reference now to FIG. 5, a backer apparatus 210 of a third construction is depicted. Unless otherwise explicitly stated, the backer apparatus 210 of the third construction may share all the same features, elements, and assembly schemes as the first and second constructions. For purposes of brevity, like elements between the first through third constructions share the same reference number designations between FIGS. 2-5. More particularly, the backer apparatus 210 is configured to connect to the same knob assembly 14 with minor modifications and may also be configured to connect to the cooking appliance 12 and the cooking appliance 12 may be configured to employ gas. In the third construction, the backer apparatus 210 defines a thin and flat body 16 with a circular outer periphery 212 extending between the front side 18 and the rear side 20. The body 16 defines the channel 28, extending about the axis A for receiving a stem of the knob assembly 14, the channel 28 may be oblong or oval. The channel 28 aligns with the aperture 46 on the panel 44 and the panel 44 includes a first panel opening 70A, and a second panel opening 70B aligned with and located within an inner boundary of the channel 28. The body 16 may also include a first body opening 213A aligned with a third panel opening 70C to receive the fastener 36B and a second body opening 213B aligned with a fourth panel opening 70D to receive the fastener 36C.

A bezel 252 of a second construction is depicted in FIG. 5 and includes an inner bezel wall 254 defining a bezel channel 256 that, when connected to the backer apparatus 210, extends around the axis A for accommodating the knob 14. The inner bezel wall 254 extends to a bezel floor 255 defining a first bezel opening 60A aligned with the first body opening 213A and also receiving fastener 36B and a second bezel opening 60B aligned with the second body opening 213B and also receiving fastener 36C.

As previously described, the backer apparatuses 10, 110, and 210 may all be configured to connect the knob assembly 14 to a gas cooking appliance. It should be appreciated that the backer apparatuses of the subsequent constructions may all be configured to connect the knob assembly 14 to an electric and/or induction cooking appliance 12. However, regardless of the type of fuel that the cooking appliance 12 employs, the various constructions of the backer apparatus described herein have front sides 18 that are configured to connect to the same knob assembly 14. In this manner, a user desiring to change the knob assembly 14 will not need to discern if the knob assembly is compatible with the cooking appliance 12 based on the type of fuel used.

Figure 6A:
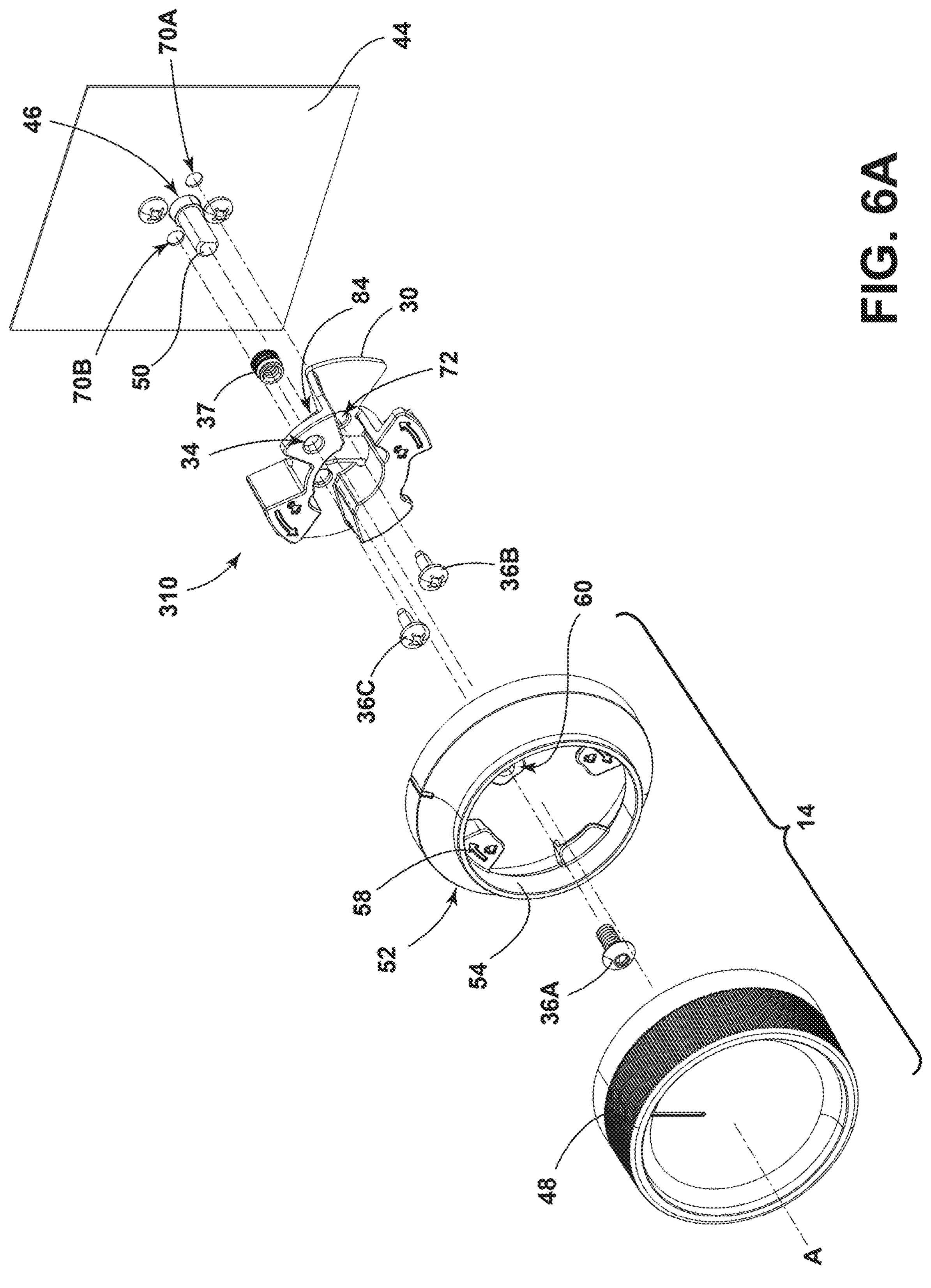
FIG. 6A is a perspective, partially disassembled view depicting a system of a fourth construction configured to easily interchange a variety of knob assemblies, according to an aspect of the present disclosure.
Figure 6C:
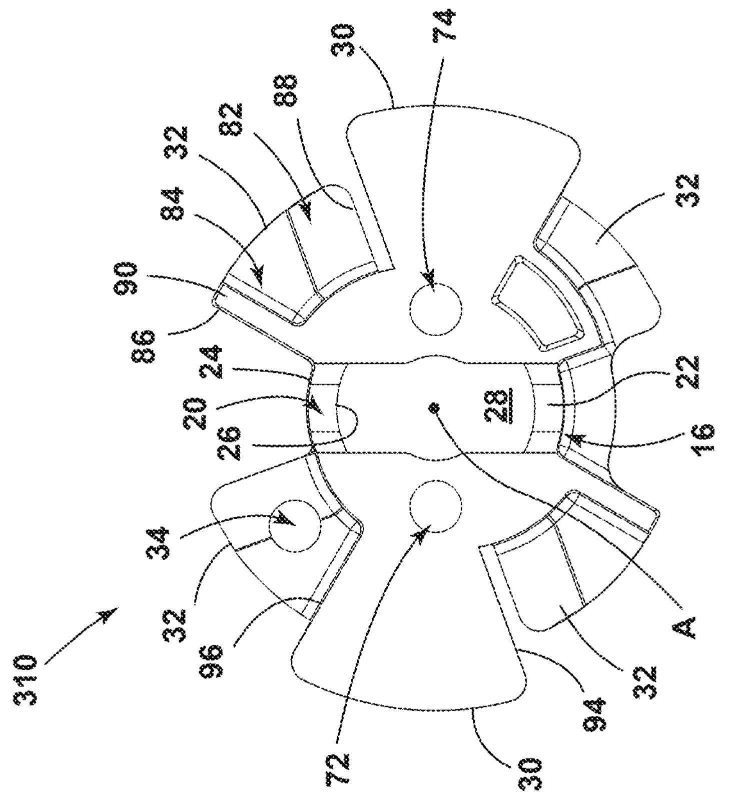
FIG. 6C is a rear elevational view of a backer apparatus from FIG. 6A, according to an aspect of the present disclosure.
Figure 6B:
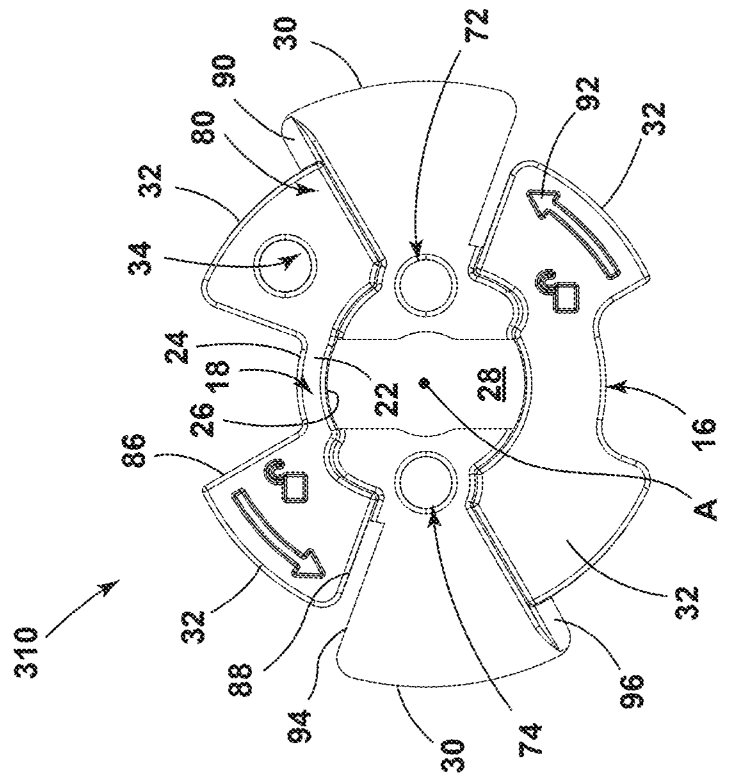
FIG. 6B is a front elevational view of a backer apparatus from FIG. 6A, according to an aspect of the present disclosure.

With reference now to FIGS. 6A-6C, a backer apparatus 310 of a fourth construction is depicted. Unless otherwise explicitly stated, the backer apparatus 310 of the fourth construction may share all the same features, elements, and assembly schemes as the first and second constructions. For purposes of brevity, like elements between the first and second constructions share the same reference number designations between FIGS. 2-5. More particularly, the backer apparatus 310 is configured to connect to the same knob assembly 14 and may also be configured to connect to the cooking appliance 12 and the cooking appliance 12 may be configured to generate heat via electricity or induction. However, the panel 44 includes a first panel opening 70A, and a second panel opening 70B aligned and securable with the first flange opening 72 and the second flange opening 74 by receiving the fasteners 36B, 36C, respectively. The rear side 20 of the backer apparatus 310 is also generally planar, for sitting flush against the cooking appliance 12 (e.g., the panel 44). Similar to the second construction, the fastener 36A may include a retainer element 37 (e.g., a bushing) that is inserted into the bezel opening 60.

Figure 7:
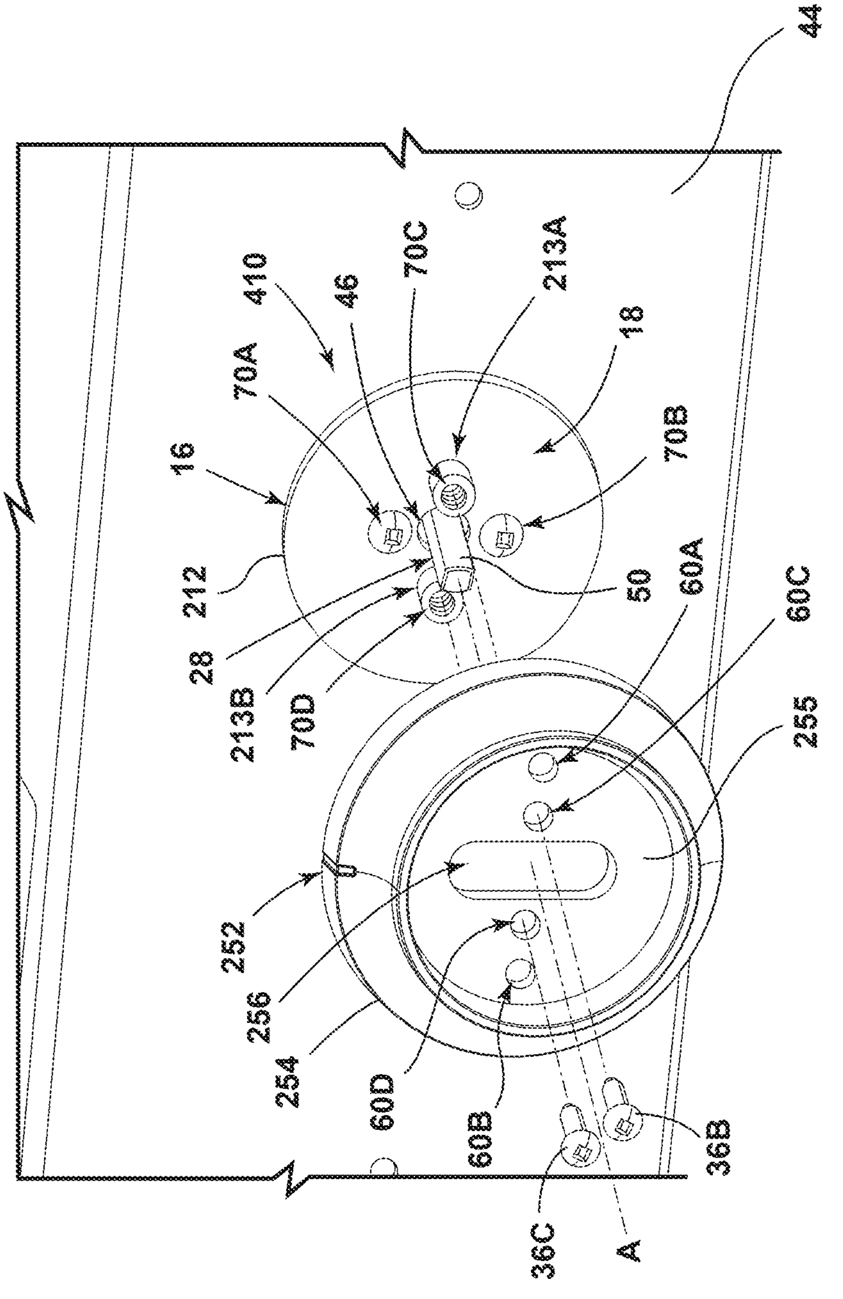
FIG. 7 is a perspective, partially disassembled view depicting a system of a fifth construction configured to easily interchange a variety of knob assemblies, according to an aspect of the present disclosure.

With reference now to FIG. 7, a backer apparatus 410 of a fifth construction is depicted. Unless otherwise explicitly stated, the backer apparatus 410 of the fifth construction may share all the same features, elements, and assembly schemes as the third construction. For purposes of brevity, like elements between the first through fifth constructions share the same reference number designations between FIGS. 2-6C. More particularly, the backer apparatus 410 is configured to connect to the same knob assembly 14 with minor modifications (i.e., employment of the bezel 252 of the second construction) and may also be configured to connect to the cooking appliance 12 and the cooking appliance 12 may be configured to generate heat via electricity or induction. In the fifth construction, the backer apparatus 210 defines the thin and flat body 16 with a circular outer periphery 212 extending between the front side 18 and the rear side 20. The body 16 defines the channel 28, extending about the axis A for receiving a stem of the knob assembly 14. However, unlike the third construction, the channel 28 may be circular and bound a region proximate the control stem 50. The channel 28 aligns with the aperture 46 on the panel 44 and the panel 44 includes the first panel opening 70A, and the second panel opening 70B outside of the inner boundary of the channel 28. The body 16 may also include a first body opening 213A aligned with a third panel opening 70C to receive the fastener 36B and a second body opening 213B aligned with a fourth panel opening 70D to receive the fastener 36C. Unlike the third construction, the first and second body openings 213A, 213B and the third and fourth panel openings 700, 70D are located proximate the aperture 46 (i.e., substantially the same distance as the first and second panel openings 70A, 70B). The bezel floor 255 depicted in both FIGS. 5 and 7, further defines a bezel third opening 60C aligned with the first body opening 213A and also receiving fastener 36B and a fourth bezel opening 60D aligned with the second body opening 213B and also receiving fastener 36C.

With reference to FIGS. 1-7, the bezel 52 depicted in FIGS. 1-4C and 6A-6C is universal to the backer apparatuses 10, 110, and 310 of the first, second, and fourth constructions (i.e., for both gas cooking appliances and electric/induction cooking appliances). Likewise, the bezel 252 depicted in FIGS. 5 and 7 is universal to the backer apparatuses 210 and 410 of the third and fifth constructions (i.e., for both gas cooking appliances and electric/induction cooking appliances). The various constructions described herein may be part of an overall system, that, for example, includes a plurality of gas cooking appliances with the backer apparatus 10, 110 of the first and/or second constructions and a plurality of electric/induction cooking appliances with the backer apparatus 310 of the fourth construction. In this manner, a user desiring to change the knob assembly 14 will not need to discern if the knob assembly 14 is compatible with the cooking appliance 12 based on the type of fuel used and can quickly install any knob assembly 14 employing the bezel 52. The system may also or alternatively include, for example, a plurality of gas cooking appliances with the backer apparatus 210 of the third construction and a plurality of electric/induction cooking appliances with the backer apparatus 410 of the fifth construction. In this manner, a user desiring to change the knob assembly 14 will not need to discern if the knob assembly 14 is compatible with the cooking appliance 12 based on the type of fuel used and can quickly install any knob assembly 14 employing the bezel 252.

The disclosure herein is further summarized in the following paragraphs and is further characterized by combinations of any and all of the various aspects described therein.

According to one aspect of the present disclosure, a backer apparatus includes a body defining a front side for interfacing with a knob assembly and a rear side for interfacing with a cooking appliance. An inner wall extends between the front side and the rear side and includes an outer surface and an inner surface. The inner surface defines a channel extending about an axis for receiving a stem of the knob assembly. At least one flange extends from the outer surface radially outwardly from the axis and at least partially defines the rear side for interfacing with the cooking appliance. A plurality of chamfers extend from the outer surface radially outwardly from the axis and at least partially define the front side. At least one of the plurality of chamfers defines a chamfer opening for receiving a fastener.

According to another aspect, a plurality of chamfers are disposed around an axis, and each of the chamfers defines a chamfer front surface at least partially defining a front side and a chamfer rear surface at least partially defining a pocket for receiving a tab from a bezel.

According to yet another aspect, each of a plurality of chamfers includes a clockwise chamfer surface and a counterclockwise chamfer surface, one of the clockwise chamfer surfaces or the counterclockwise chamfer surfaces defining a stop wall for abutting a tab of a bezel upon relative rotation.

According to still yet another aspect, at least one chamfer front surface includes an indicia depicting a direction of rotation to interlock or release a tab of a bezel in a pocket.

According to another aspect, at least one flange includes a plurality of flanges, each flange including a clockwise flange surface and a counterclockwise flange surface, one of the clockwise flange surfaces and the counterclockwise flange surfaces extending to a stop wall.

According to yet another aspect, each stop wall extends between one of a clockwise chamfer surface to one of a counterclockwise flange surface.

According to still yet another aspect, each stop wall extends between one of a counterclockwise chamfer surface to one of a clockwise flange surface.

According to another aspect, a rear side defines at least one projection for insertion into a panel of a cooking appliance and to prevent rotation relative to a cooking appliance.

According to yet another aspect, a fastener is configured to be inserted into a chamfer opening and a bezel opening defined by a tab of a bezel.

According to still yet another aspect, a retainer element is inserted into the bezel opening.

According to another aspect, at least one flange defines a flange opening for receiving a fastener for coupling the flange to a cooking appliance.

According to yet another aspect, a gas cooking appliance includes a backer apparatus includes a body defining a front side for interfacing with a knob assembly and a rear side for interfacing with a cooking appliance. An inner wall extends between the front side and the rear side and includes an outer surface and an inner surface. The inner surface defines a channel extending about an axis for receiving a stem of the knob assembly. At least one flange extends from the outer surface radially outwardly from the axis and at least partially defines the rear side for interfacing with the cooking appliance. A plurality of chamfers extend from the outer surface radially outwardly from the axis and at least partially define the front side. At least one of the plurality of chamfers defines a chamfer opening for receiving a fastener. At least one flange defines a flange opening for receiving a fastener for coupling the flange to a cooking appliance.

According to still yet another aspect, an electric cooking appliance includes a backer apparatus includes a body defining a front side for interfacing with a knob assembly and a rear side for interfacing with a cooking appliance. An inner wall extends between the front side and the rear side and includes an outer surface and an inner surface. The inner surface defines a channel extending about an axis for receiving a stem of the knob assembly. At least one flange extends from the outer surface radially outwardly from the axis and at least partially defines the rear side for interfacing with the cooking appliance. A plurality of chamfers extend from the outer surface radially outwardly from the axis and at least partially define the front side. At least one of the plurality of chamfers defines a chamfer opening for receiving a fastener. At least one flange defines a flange opening for receiving a fastener for coupling the flange to a cooking appliance.

According to another aspect of the present disclosure, a cooking appliance includes an appliance body including a cooktop having a burner, and a panel defining an aperture for receiving a knob assembly that controls the burner. A backer apparatus is coupled to the panel. The backer apparatus includes a body defining a front side for interfacing with the knob assembly and a rear side for interfacing with the panel. An inner wall extends between the front side and the rear side and includes an outer surface and an inner surface. The inner surface defines a channel extending about an axis and aligned with the aperture on the panel. A plurality of flanges extend from the outer surface radially outwardly from the axis and at least partially define the rear side abutting the panel. At least one of the plurality of flanges defines a first flange opening aligned with and secured to the appliance body with a fastener. A plurality of chamfers extend from the outer surface radially outwardly from the axis and at least partially define the front side. Each of the plurality of chamfers includes a clockwise chamfer surface and a counterclockwise chamfer surface, one of the clockwise chamfer surfaces or the counterclockwise chamfer surfaces defining a stop wall for abutting a tab of the knob assembly upon relative rotation.

According to another aspect, a panel defines an anti-rotation orifice, and a rear side of a backer apparatus defines at least one projection for insertion into the anti-rotation orifice, preventing rotation relative to an appliance body.

According to yet another aspect, a manifold assembly for distributing gas to a burner is at least partially supported by a spider bracket. The spider bracket defines a bracket opening, and wherein a fastener extends from a first flange opening to the bracket opening.

According to yet another aspect, a panel includes a panel opening and at least one of a plurality of flanges defines a second flange opening aligned with and secured to the panel opening.

According to another aspect, at least one of a plurality of chamfers defines a chamfer opening for receiving a fastener extending through a bezel opening of a bezel.

According to yet another aspect of the present disclosure, a system for a cooking appliance includes a knob assembly that has a knob with a stem configured to mate with a control stem of the cooking appliance and a bezel. The bezel includes an inner bezel wall defining a bezel channel that extends around an axis for accommodating the knob. The inner bezel wall defines at least one tab extending radially inwardly towards the axis. A backer apparatus is configured to connect the knob assembly to the cooking appliance. The backer apparatus includes a body defining a front side for interfacing with the knob assembly and a rear side for interfacing with the cooking appliance. An inner wall extends between the front side and the rear side and includes an outer surface and an inner surface. The inner surface defines a channel extending about the axis and aligned with the bezel channel. A plurality of chamfers extend from the outer surface radially outwardly from the axis and at least partially define the front side. Each of the plurality of chamfers includes a clockwise chamfer surface and a counterclockwise chamfer surface, one of the clockwise chamfer surfaces or the counterclockwise chamfer surfaces defines a stop wall for abutting the at least one tab of the bezel upon relative rotation.

According to another aspect, at least one of a plurality of chamfers defines a chamfer opening and at least one tab defines a bezel opening for receiving a common fastener.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A backer apparatus, comprising:

a body defining a front side for interfacing with a knob assembly and a rear side for interfacing with a cooking appliance;

an inner wall extending between the front side and the rear side and including an outer surface and an inner surface, the inner surface defining a channel extending about an axis for receiving a stem of the knob assembly;

at least one flange extending from the outer surface radially outwardly from the axis and at least partially defining the rear side for interfacing with the cooking appliance; and a plurality of chamfers extending from the outer surface radially outwardly from the axis and at least partially defining the front side, at least one of the plurality of chamfers defining a chamfer opening for receiving a fastener.

2. The backer apparatus of claim 1, wherein the plurality of chamfers are disposed around the axis, and each of the chamfers defines a chamfer front surface at least partially defining the front side and a chamfer rear surface at least partially defining a pocket for receiving a tab from a bezel.

3. The backer apparatus of claim 2, wherein each of the plurality of chamfers includes a clockwise chamfer surface and a counterclockwise chamfer surface, one of the clockwise chamfer surfaces or the counterclockwise chamfer surfaces defining a stop wall for abutting the tab of the bezel upon relative rotation.

4. The backer apparatus of claim 3, wherein at least one chamfer front surface includes an indicia depicting a direction of rotation to interlock or release the tabs of the bezel in the pockets.

5. The backer apparatus of claim 3, wherein the at least one flange includes a plurality of flanges, each flange including a clockwise flange surface and a counterclockwise flange surface, one of the clockwise flange surfaces and the counterclockwise flange surfaces extending to the stop wall.

6. The backer apparatus of claim 5, wherein each stop wall extends between one of the clockwise chamfer surfaces to one of the counterclockwise flange surfaces.

7. The backer apparatus of claim 5, wherein each stop wall extends between one of the counterclockwise chamfer surfaces to one of the clockwise flange surfaces.

8. The backer apparatus of claim 1, wherein the rear side defines at least one projection for insertion into a panel of the cooking appliance and preventing rotation relative the cooking appliance.

9. The backer apparatus of claim 1, further including the fastener configured to be inserted into the chamfer opening and a bezel opening defined by one of the tabs of the bezel.

10. The backer apparatus of claim 9, further including a retainer element is inserted into the bezel opening.

11. The backer apparatus of claim 1, wherein the at least one flange defines a flange opening for receiving a fastener for coupling the flange to the cooking appliance.

12. A gas cooking appliance including the backer apparatus of claim 11.

13. An electric cooking appliance including the backer apparatus of claim 11.

14. A cooking appliance comprising:

an appliance body including a cooktop having a burner, and a panel defining an aperture for receiving a knob assembly that controls the burner; and a backer apparatus coupled to the panel, the backer apparatus comprising:

a body defining a front side for interfacing with the knob assembly and a rear side for interfacing with the panel;

an inner wall extending between the front side and the rear side and including an outer surface and an inner surface, the inner surface defining a channel extending about an axis and aligned with the aperture on the panel;

a plurality of flanges extending from the outer surface radially outwardly from the axis and at least partially defining the rear side abutting the panel, at least one of the plurality of flanges defining a first flange opening aligned with and secured to the appliance body with a fastener; and a plurality of chamfers extending from the outer surface radially outwardly from the axis and at least partially defining the front side, each of the plurality of chamfers includes a clockwise chamfer surface and a counterclockwise chamfer surface, one of the clockwise chamfer surfaces or the counterclockwise chamfer surfaces defining a stop wall for abutting a tab of the knob assembly upon relative rotation.

15. The cooking appliance of claim 14, wherein the panel defines an anti-rotation orifice and the rear side of the backer apparatus defines at least one projection for insertion into the anti-rotation orifice preventing rotation relative to the appliance body.

16. The cooking appliance of claim 14, further including a manifold assembly for distributing gas to the burner at least partially supported by a spider bracket, the spider bracket defining a bracket opening, and wherein a fastener extends from the first flange opening to the bracket opening.

17. The cooking appliance of claim 16, wherein the panel includes a panel opening and at least one of the plurality of flanges defining a second flange opening aligned with and secured to the panel opening.

18. The cooking appliance of claim 14, wherein at least one of the plurality of chamfers defines a chamfer opening for receiving a fastener extending through a bezel opening of a bezel.

19. A system for a cooking appliance comprising:

a knob assembly including a knob with a stem configured to mate with a control stem of the cooking appliance and a bezel, the bezel including an inner bezel wall defining a bezel channel extending around an axis for accommodating the knob, the inner bezel wall defining at least one tab extending radially inwardly towards the axis; and a backer apparatus configured to connect the knob assembly to the cooking appliance, the backer apparatus comprising:

a body defining a front side for interfacing with the knob assembly and a rear side for interfacing with the cooking appliance;

an inner wall extending between the front side and the rear side and including an outer surface and an inner surface, the inner surface defining a channel extending about the axis and aligned with the bezel channel; and a plurality of chamfers extending from the outer surface radially outwardly from the axis and at least partially defining the front side, each of the plurality of chamfers includes a clockwise chamfer surface and a counterclockwise chamfer surface, one of the clockwise chamfer surfaces or the counterclockwise chamfer surfaces defining a stop wall for abutting the at least one tab of the bezel upon relative rotation.

20. The system of claim 19, wherein at least one of the plurality of chamfers defines a chamfer opening and the at least one tab defines a bezel opening for receiving a common fastener.

* * * * *